United States Patent [19]

Davis et al.

[11] 4,196,567
[45] Apr. 8, 1980

[54] SIDE SHEET FOR AN IMPELLER MOWER-CONDITIONER

[75] Inventors: Wilbur M. Davis; Ralph C. Gold, both of Ottumwa, Iowa; Angel L. Giani, Ancier, France

[73] Assignee: Deere & Company, Moline, Ill.

[21] Appl. No.: 902,655

[22] Filed: May 4, 1978

[51] Int. Cl.² ............................................. A01D 43/00
[52] U.S. Cl. ................................. 56/13.7; 56/DIG. 1; 56/16.4
[58] Field of Search ...................... 56/1, DIG. 1, 14.4, 56/16.4, 13.7

[56] References Cited

U.S. PATENT DOCUMENTS

| 3,596,445 | 8/1971 | Lierers et al. | 56/13.7 |
| 3,698,162 | 10/1972 | Scarnato et al. | 56/1 |
| 4,055,037 | 10/1977 | Oosterling et al. | 56/16.4 |

FOREIGN PATENT DOCUMENTS 2730146   1/1978   Fed. Rep. of Germany ................ 56/6

*Primary Examiner*—Russell R. Kinsey

[57] ABSTRACT

A tractor drawn and powered impeller mower-conditioner includes a transverse cutter assembly comprising a series of side-by-side rotating cutting disks. An impeller rotor with free-swinging flails is mounted above and slightly to the rear of the cutter bar with its axis of rotation parallel to the cutter assembly. A hood over the rotor includes a confining forward conditioning plate conforming fairly closely to the rotor periphery to form a conditioning zone and a rearwardly extending deflecting and windrow forming portion. The rotor is disposed and rotated so that the flails intercept cut material delivered rearwardly by the cutter assembly and carry it inside the hood up and over the rotor through the conditioning zone to be discharged rearwardly into a windrow. The hood includes a side sheet having a fore-and-aft extending wall closely adjacent and alongside an end disk of the cutter assembly and shaped and disposed to function primarily as a combined crop divider and safety shield, parting the standing crop ahead of the end disk to facilitate cutting and extending below the level of the disk to form a protective guard.

6 Claims, 4 Drawing Figures

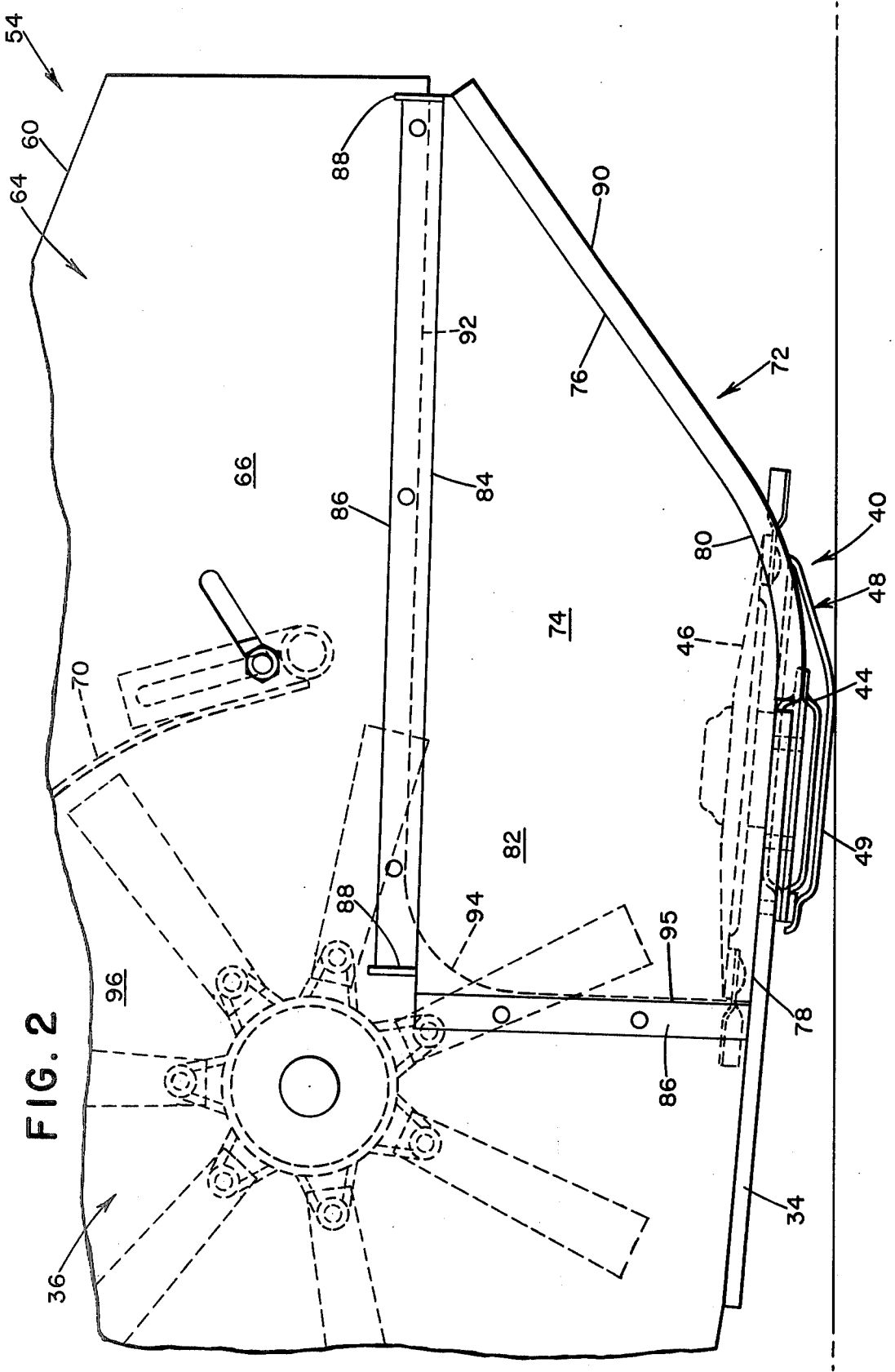

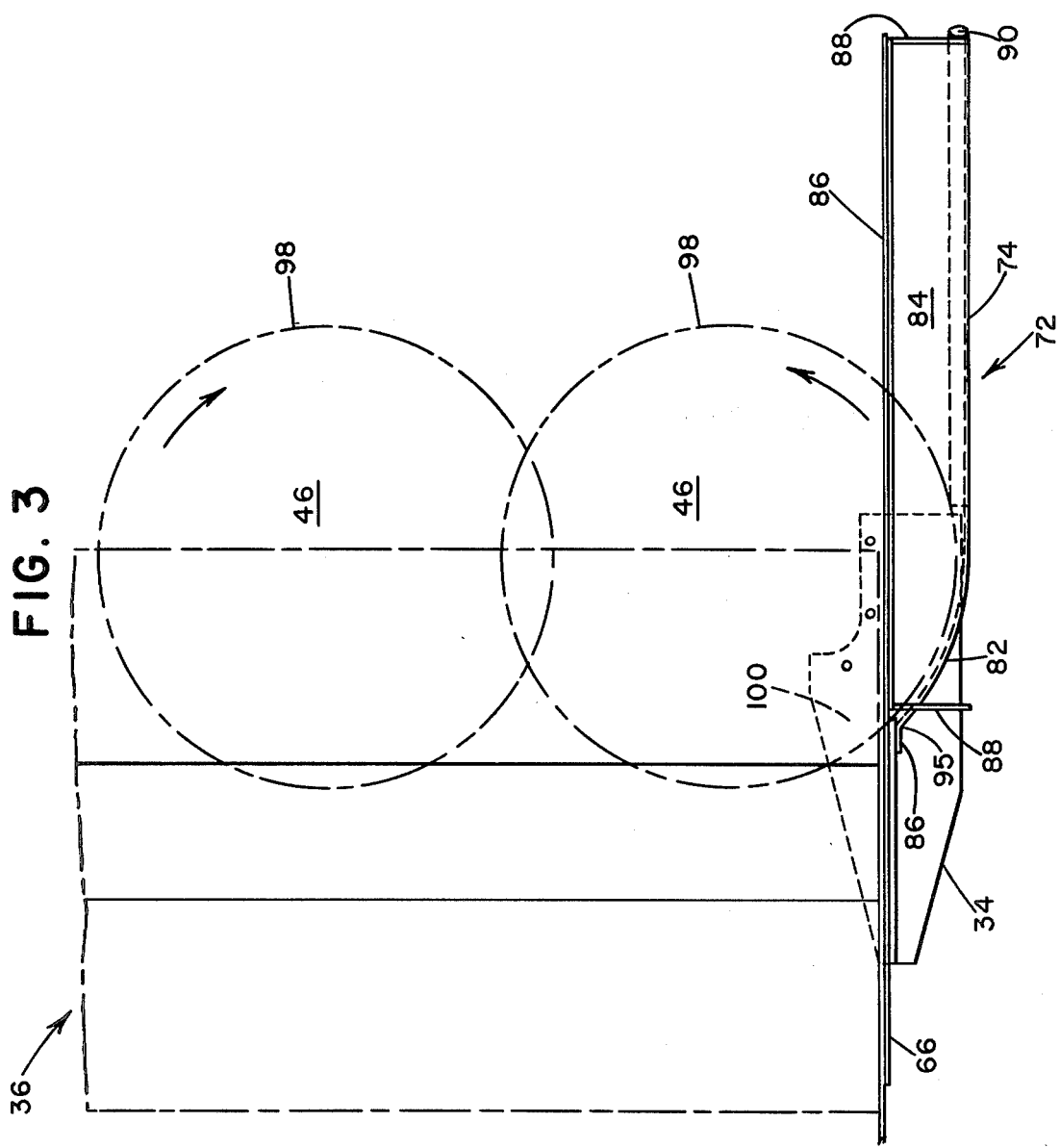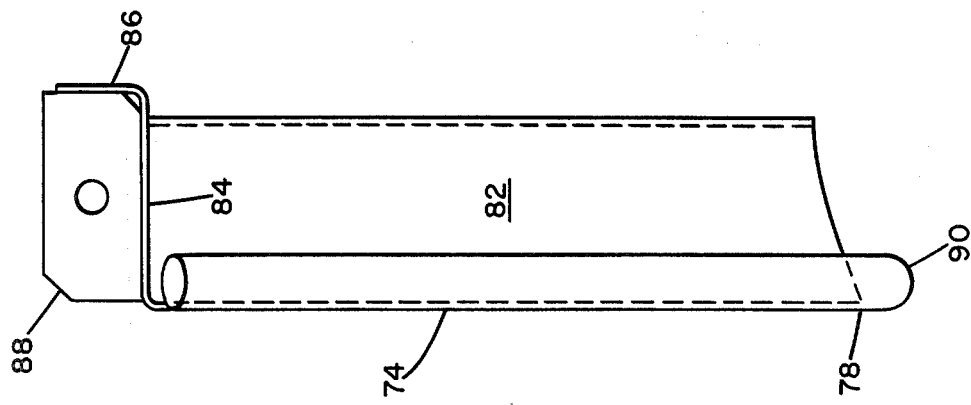

SIDE SHEET FOR AN IMPELLER MOWER-CONDITIONER

BACKGROUND OF THE INVENTION

This invention relates to a machine for cutting, conditioning and windrowing crop material, such as grasses and legumes, of the type in which a generally transverse rotary disk or drum cutter assembly delivers cut material rearwardly to an adjacent impeller rotor parallel to the cutter assembly for conditioning and discharge into a windrow and more particularly to an improved side sheet for such a machine.

In designing such machines, particular attention must be paid to the arrangement of components at the end of the cutter assembly, typically the right-hand end, which, during operation, enters the uncut standing crop. Typically, the end disk cutting element rotates in such a direction that material engaged and cut by it is carried generally laterally inward before being delivered rearwardly over the cutter assembly. Design objectives must include a divider structure which does not flatten part of the crop (and result in uncut material), and a side sheet and divider structure which avoids spilling cut material onto the ground or dragging uncut material. Difficult tangled material conditions must be tolerated without plugging and there must be smooth transfer of crop material from the cutter assembly to the rotor. In addition, the outer or end disk of such a machine must be shielded as far as possible to reduce the risk of injury to an operator or other person through inadvertent contact or through throwing of foreign objects by the disk cutting element.

In the past, the design of side sheets (extending fore-and-aft adjacent the end of the rotor and cutter assembly) has often been compromised in the interests of trouble-free non-stop operation by the adoption, for example, of divider designs associated with the side sheet having insufficient forward or downward reach to part the crop adequately and offering no safety shielding over the outermost reach of the end cutting disk element. Typically, that element is partially and dangerously exposed reaching laterally outward of the side sheet or divider wall in an attempt to achieve clean cutting.

SUMMARY OF THE INVENTION

Accordingly, an object of the present invention is to provide a side sheet for an impeller mower-conditioner of the above description which combines efficiently, effectively and simply the functions of dividing or parting the standing crop and maximum possible safety shielding of the outer end of the disk cutter assembly commensurate with maintenance of good machine function.

It is a feature of the invention that the divider portion of the side sheet includes a thin wall with a narrow forward edge sloping forwardly and upwardly to part the standing crop ahead of the cutter assembly but that at the level of the disk cutting element, the divider edge is approximately in lateral alignment with the foremost reach of the cutting elements, and that the lower edge of the divider terminates somewhat above the level of a ground-supporting surface provided inboard of and below the disk cutting elements at the end of the cutter assembly, so that the crop material engaged by the divider is not flattened or crushed by it. This configuration provides extensive safety shielding at the end of the cutter assembly.

Preferably, the divider may be provided with a gently curved transition edge or heel between the forwardly and upwardly sloping divider edge and a generally horizontal bottom edge and mutually tangential to those edges. Additionally, the dividing edge forward portion may be reinforced by an elongated element of cross section greater than the preferably thin section of the divider wall portion. This has the advantage of reducing the friction at the dividing edge itself (if a suitably rounded section is used) and immediately rearward of the dividing edge due to the relief so provided.

It is a feature of the invention that the inner surface of the divider wall is disposed as closely as practically possible to the laterally outermost reach of the end disk cutting element. This helps achieve a clean cut without the dribbling loss of cut material onto the ground.

Another advantage of the invention is that the provision of an extensive combination side sheet and divider, particularly in combination with a suitable hood extending above the rotor and cutter assembly, improves material and air control by so enclosing the end of rotor and cutter assembly as to minimize the "end effect" of air loss and material spillage.

A further feature of the invention is that material and air flow control may be further enhanced in a machine in which the cutter assembly is arranged to extend laterally somewhat outboard of the rotor end by providing a divider and safety shield portion of the side sheet in the form of a box open to and extending partially around the end disk cutting element and having an upright fore-and-aft extending divider wall spaced laterally outwardly from an upper portion of the side sheet, including a rear wall portion extending rearwardly and inwardly immediately rearwardly of the end disk cutting element, and connected at its top to the upper side sheet by an elongated fore-and-aft approximately horizontally extending cover.

It is an advantage of the invention that the safety shield may be integral with the side sheet and is not required to be separately removable for service and adjustment.

BRIEF DESCRIPTION OF THE DRAWINGS

FIG. 2 is an enlarged partial right side elevation particularly showing the divider and safety shield portion of the side sheet.

FIG. 3 is an enlarged partial overhead view of a forward portion of the side sheet and right-hand end of the cutter assembly particularly showing the divider and its relationship to the end disk cutting element of the cutter assembly.

FIG. 4 is a front elevation of the combined divider and safety shield removed from the machine.

DESCRIPTION OF THE PREFERRED EMBODIMENT

Figure 1:
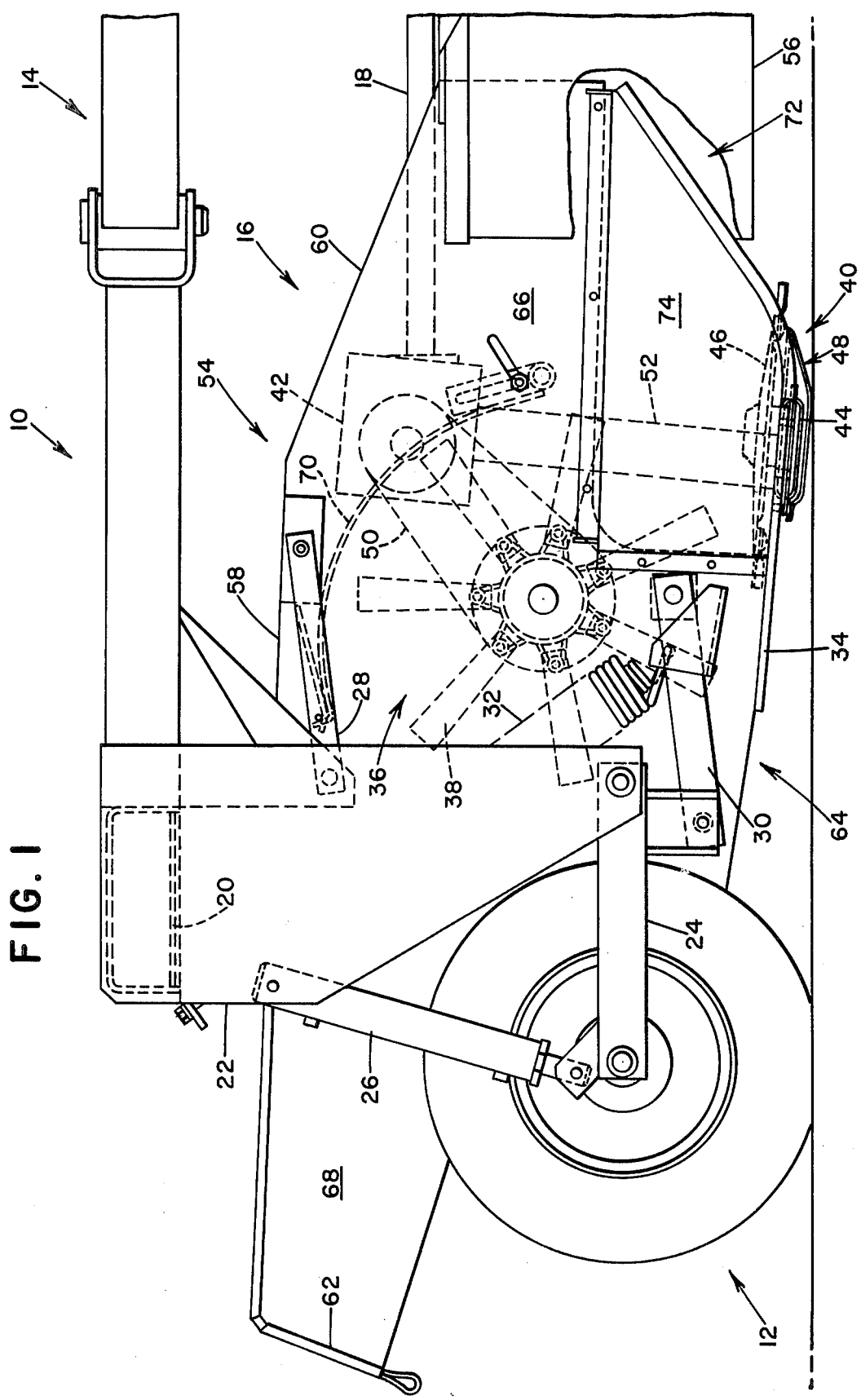
FIG. 1 is a somewhat schematic right side elevation of an impeller mower-conditioner embodying the invention with the header in operating position but omitting forward portions of a tongue drive line and safety curtain.

The invention is embodied in an impeller mower-conditioner which includes a main frame indicated generally by the numeral 10, a pair of wheel assemblies 12 for supporting the machine above the ground, a forward extending tongue 14 for hitching to a towing vehicle such as an agricultural tractor, a header 16 carried by the main frame 10 and a drive line 18 for transmitting power from the towing vehicle to the header 16. A mower-conditioner of this type is described in detail in co-pending U.S. patent application Ser. No. 853,035, also assigned to the assignee of the present invention.

The main frame includes a transverse arch-like structure composed of the transverse beam 20 (the cross sectional outline of which is indicated only in hidden outline in FIG. 1), an opposite upright left- and right-hand depending portions or wheel drops 22 rigidly attached to the opposite ends of the beam 20, each wheel assembly includes a wheel support arm 24 pivotally connected to the lower end of the wheel drop members 22 and a hydraulic cylinder 26 for swinging the wheel support arm 24 to control the height of the main frame 10 and hence of the header 16 between a transport position and operating positions such as that indicated in FIG. 1.

The header 16 is floatingly supported between the wheel drops 22 by a suspension system including approximately parallel upper and lower links 28 and 30, respectively, and a float spring 32. The header 16 includes sub-frame members providing structural support for components of the header including a right-hand knife support bracket 34 (seen best in FIGS. 2 and 3). Other sub-frame members (not shown in the drawings) provide structural support for a transversely extending rotor 36 which includes a plurality of swingably mounted flails or conditioning elements 38, a transversely extending disk cutter assembly 40 and a gear box 42. The cutter assembly 40, shown in some detail in end view in FIG. 2, includes an elongated flattened tubular beam member 44 on which are carried a plurality of disk cutting elements 46. The right-hand knife support bracket 34 supports the right-hand outer end of the cutter assembly 40. Rigidly attached to the underside of the beam 44 and spaced somewhat inwardly from the outer end of the cutter assembly 40 is a skid shoe 48 providing a ground-engaging under-surface 49 or gauge member to limit the minimum cutting height of the cutter assembly.

Drives for the rotor 36 and the cutting elements 46 of the cutter assembly are conventional, the gear box 42 receiving input from the drive line 18 and transmitting power through a V-belt drive 50 and a shaft and gear drive 52 to the rotor 36 and to the disk cutting elements 46 of the cutter assembly 40, respectively.

The header sub-frame also supports a hood 54 which substantially encloses the rotor 36 and cutter assembly 40 and carries at its forward end a flexible safety curtain assembly 56. The hood 54 includes an approximately horizontal top sheet 58 from which extend a forwardly and downwardly inclined baffle sheet 60 and from the rear of the top sheet 58, a rearwardly and downwardly inclined baffle 62. The inverted box-like form of the hood 54 is completed by opposite side sheets 64 which include a forward portion 66 extending fore-and-aft and vertically alongside the rotor 36 and extending forwardly and upwardly to meet the forward baffle 60 and the hood top 58. A contiguous rear side sheet portion 68 extends rearwardly from the front portion 66 and converges inwards towards the rear (not shown in the drawings) to assist in deflecting the treated crop into a windrow.

The header 16 also includes an arcuate conditioning plate or concave 70 approximately concentric with the rotor 36 and extending transversely and supported between the opposite side sheet forward portions 66.

Rigidly attached to and forming part of the lower forward portion of the right-hand forward side sheet 66 is a divider and safety shield assembly 72. This assembly includes an upright fore-and-aft extending forward wall portion 74 having a forwardly and upwardly extending divider edge 76 and an approximately horizontal (when the header is in operating position) bottom edge 78. A gently curved transition or heel edge 80 extends between and is mutually tangential to the divider edge 76 and the bottom edge 78. An inwardly curved rear wall portion 82 is contiguous with the outer wall portion 74 and extends to meet the forward side sheet 66. The divider and safety shield assembly 72 also includes a top wall 84 extending approximately horizontally between the top of the outer and rear wall portions 74 and 82, respectively, to meet the forward side sheet 66. Suitable flanges 86 are provided for attaching the divider and safety shield assembly 72 to the forward side sheet 66 and the assembly is braced by knee brackets 88 extending between the top wall 84 and the upper of the flanges 86. A reinforcing and dividing tube 90 extends along and is rigidly attached to the divider and heel edges 76 and 80, respectively, of the outer wall 74. A forward lower portion of the right-hand side sheet forward portion 66 is cut-away, leaving an opening top edge 92 and an opening rear vertical edge 94, said edges being in approximate alignment with the top wall 84 and the inner edge 95 of the rear wall 72 where it meets the side sheet forward portion 66.

In operation the impeller mower-conditioner is advanced in a field of standing crop powered by a towing vehicle such as an agricultural tractor so that the cutter assembly 40 severs the crop material, the severed material tending to move rearwardly over the cutter bar. The material is intercepted by the flails 38 of the rotor 36 and carried at first generally upwards and then up and over the rotor 36 through a conditioning zone 96 defined by the juxtaposition of the conditioning plate 70 and the rotor 36 to be discharged in a generally rearwardly and horizontally directed stream of material within the hood 54.

The machine is normally advanced in the field so that uncut crop is to the right of the machine, the divider tube 90 penetrating and parting the standing crop, preparing that part of the crop passing inside the divider to be received by the cutting disk 46 and disturbing the remainder of the standing crop as little as possible. As can be seen from FIG. 2, the divider reaches ahead of the cutting disk to divide the crop but the disposition of components is such that, as is desirable, soon after division takes place, the crop is engaged by the cutting disk 46. This dispositional relationship may be defined by noting that at the level of the cutting disk 46, the divider edge 76 is approximately laterally aligned with the furthest forward reach of the disk 46.

It can be seen too that the generous curve of the divider heel 80 and the gentle slope of the divider edge 76 allows the divider to pass through the crop with little possibility of dragging material. Also, as can be seen in FIG. 2, the skid shoe under-surface 49, being lower than the bottom edge of the divider 78 ensures that there is always room for the crop material to pass under the bottom edge of the divider without being crushed between it and the ground.

The divider is preferably thin but use of a round reinforcement such as a tube 90 as in this embodiment has the advantage of presenting a low friction edge to avoid hairpinning of material as well as creating a somewhat friction reducing relief (reduction of thickness) immediately rearward of the divider tube 90.

FIG. 2 also illustrates that the divider wall bottom edge 78 reaches below the cutting disk 46 to provide a safety shield against the outer extremity of the cutter assembly 40.

FIG. 3 illustrates that low clearances are maintained between the periphery 98 of the cutting disk 46 and the divider walls 74 and 82 to insure clean and efficient cutting of crop material approaching the disk cutter 46 adjacent the inside of the divider wall 74.

FIG. 3 also illustrates the close proximity of the walls 74 and 82 of the divider and safety shield assembly 72 to the disk cutter element 46, and of the forward side sheet portion 66 to the end of the rotor. Such proximity assisted by the shelf-like extension 100 of the right-hand knife mounting bracket 34 under the rotor 36 and cutter assembly 40 serves to reduce "end effects" of spillage and loss of efficiency by confining and limiting the moving crop material and air to the intended channels within the transverse extent of the rotor and cutter assembly.

We claim:

1. In an impeller mower-conditioner for advancing over a field to cut, condition and windrow crop material including a frame having opposite sides, a transverse cutter assembly carried by the frame and having a plurality of side-by-side rotary disk cutting elements for cutting the crop material and delivering it rearwardly as the mower-conditioner advances, each cutting element being rotatable about an upright axis and including opposite left- and right-hand end cutting elements rotatable in clockwise and counterclockwise directions respectively as viewed from above, said cutter assembly including a ground-engaging surface terminating inwardly of an end of the cutter assembly and disposed below the disk elements to maintain the disk elements above the ground, an impeller rotor transversely and rotatably mounted in the frame and disposed above the cutter assembly so as to intercept crop material delivered rearwardly by the cutting elements, a hood carried by the frame and extending between the opposite sides and substantially covering the rotor and cutter assembly and having a top including a transversely extending conditioning hood portion approximately concentric with the rotor and extending over approximately the forward upper quadrant of the rotor in a crop material controlling and conditioning relationship and a rearward extending deflector hood portion, drive means for rotating the cutting elements and drive means for rotating the impeller rotor so that crop material intercepted by the rotor is carried over the top of the rotor under the hood and discharged rearwardly into the deflector portion or the hood and so that air is entrained and carried with the crop material, the improvement in the hood comprising:

an upright fore-and-aft extending side sheet including an upper portion disposed alongside an end of the rotor and extending to meet the top portions of the hood and including a forward lower portion having a fore-and-aft extending upright wall closely adjacent the laterally extreme periphery of an end disk cutting element, said lower forward portion having a crop dividing edge sloping forwardly and upwardly and disposed so that in the plane of the disk cutting element the edge approximately intersects a transverse line defined by the foremost reach of the periphery of the side-by-side cutting elements, and a bottom edge lying in a plane approximately parallel to the plane of the disk cutting elements but substantially below said plane and above the plane of the ground-engaging surface of the cutter assembly so that as the machine advances, the dividing edge divides the standing crop to facilitate the cutting function of the end disk cutting element and the wall portion adjacent the bottom edge provides a safety shield for the end disk element and the side sheet confines and controls crop material cut by the end disk cutting element and crop material and air moved and entrained by the rotor.

2. The invention defined in claim 1 wherein the forward lower portion of the side sheet includes a curved divider heel edge portion disposed between the dividing edge and the bottom edge and mutually tangential to said two edges.

3. The invention defined in claim 2 wherein the divider and heel edges are reinforced by an elongated member having a lateral dimension greater than the thickness of the forward lower portion wall, rigidly attached to and aligned with said divider and heel edges.

4. The invention defined in claim 1 wherein the forward lower wall portion is spaced laterally outwards from the side sheet upper portion.

5. The invention defined in claim 4 and further including a fore-and-aft extending elongated ledge-like filler extending between and forward lower wall portion and the upper portion of the side sheet and disposed above the end disk cutting element.

6. The invention defined in claim 4 wherein the upright forward lower wall includes a rearwardly and inwardly extending deflector portion rearwardly adjacent the periphery of the outer rotary cutting element.

* * * * *

UNITED STATES PATENT OFFICE
CERTIFICATE OF CORRECTION

Patent No. 4,196,567  Dated 8 April 1980

Inventor(s) Wilbur M. Davis, Ralph C. Gold and Angel L. Giani

It is certified that error appears in the above-identified patent and that said Letters Patent are hereby corrected as shown below:

Column 6, line 2, delete "or" and insert -- of --; line 47, delete "and" and insert -- the --.

Signed and Sealed this

Second Day of December 1980

[SEAL]

*Attest:*

SIDNEY A. DIAMOND

*Attesting Officer*  *Commissioner of Patents and Trademarks*